United States Patent
Park et al.

[19]

[11] Patent Number: 6,101,037
[45] Date of Patent: Aug. 8, 2000

[54] APPARATUS AND A METHOD FOR COMBINING LIGHT BEAMS BY USING TWO FLAT PLATES WITH AN AIR GAP THEREBETWEEN

[75] Inventors: Young Jun Park, Euwang; Jung Ho Park, Sungnam; Young Mo Hwang, Seoul; Yong Hoon Kim, Sungnam, all of Rep. of Korea

[73] Assignee: Samsung Electronics Co., Ltd., Suwon, Rep. of Korea

[21] Appl. No.: 09/090,220

[22] Filed: Jun. 4, 1998

[30] Foreign Application Priority Data

Jul. 25, 1997 [KR] Rep. of Korea ................ 97-35053

[51] Int. Cl.[7] .................................................. G02B 27/10
[52] U.S. Cl. .................. 359/618; 359/627; 359/629; 359/583; 359/589; 359/722
[58] Field of Search ..................... 359/618, 629, 359/722, 583, 566, 589, 590, 723, 627, 628, 634; 250/226, 578.1; 353/31

[56] References Cited

U.S. PATENT DOCUMENTS

| | | | |
|---|---|---|---|
| 4,125,864 | 11/1978 | Aughton | 358/298 |
| 4,533,215 | 8/1985 | Trias et al. | 350/347 E |
| 4,720,747 | 1/1988 | Crowley | 348/758 |
| 4,823,357 | 4/1989 | Casey | 359/618 |
| 5,071,225 | 12/1991 | Inoue | 359/634 |
| 5,253,073 | 10/1993 | Crowley | 358/231 |
| 5,311,321 | 5/1994 | Crowley | 348/760 |
| 5,583,683 | 12/1996 | Scobey | 359/589 |
| 5,625,494 | 4/1997 | Fukushima | 359/629 |
| 6,005,718 | 12/1999 | Park et al. | 359/627 |

FOREIGN PATENT DOCUMENTS

| | | |
|---|---|---|
| 0 211 596 | 2/1987 | European Pat. Off. . |
| 55-25045 | 2/1980 | Japan . |

*Primary Examiner*—Loha Ben
*Attorney, Agent, or Firm*—Burns, Doane, Swecker & Mathis, L.L.P.

[57] ABSTRACT

A light combining apparatus using two flat plates combines three separate light beams having blue, green and red wavelengths to a single combined light beam for a light source by an easier and simple small-sized device and makes the combined light beam smoothly enter the place for implementing the final information. The apparatus includes a reflection mirror for reflecting light beams with all of the wavelengths, at least one filter for transmitting only at least one light beam with a specific wavelength and reflecting light beams with the other wavelengths, and a medium located between the reflection mirror and the filter, through which the incident light beams and the reflected light beams pass, wherein the three light beams are combined into a single light beam within the medium which single light beam then exits the apparatus. A method of combining separate light beams having different wavelengths is also disclosed.

10 Claims, 2 Drawing Sheets

APPARATUS AND A METHOD FOR COMBINING LIGHT BEAMS BY USING TWO FLAT PLATES WITH AN AIR GAP THEREBETWEEN

FIELD OF THE INVENTION

The present invention relates to combining light beams from three light sources into one light beam. The present invention combines specific wavelengths such as blue, green and red wavelengths into one light beam for a light source by a easier and simple small-sized device and makes the combined beam smoothly enter the system in which it is to be used.

DESCRIPTION OF THE RELATED ART

A light apparatus using a white-light source comprises a light generation sub-system, a light modulation sub-system and a scanning sub-system. Once the white-light is generated in the light generation sub-system, the separated light beams are made to enter the light modulation sub-system and the beam is modulated from each external signal and the modulated beam is combined into one light beam, then an image is displayed by the scanning sub-system.

In the case of the image implementation apparatus in the prior art as illustrated in FIG. 1, the three modulated beams (100, 200, 300) are combined into one light beam (400) by three aligned filters (a high-reflection mirror 150, a dichroic mirror 250, and a dichroic mirror 350) for color-combining and the one light beam is passed into the optical system of the scanning sub-system.

In this case, a minimum space is required for each filter for color combining and the structure of the optical system becomes large. Additionally, maximum performance can be obtained only on the condition that each beam and each filter is exactly aligned. Thus, it is required that a great effort be made to align the light beams and the filters exactly with each other, since even a minimum error may give rise to light loss in the overall system.

Therefore, the prior art system has disadvantages in that the minimum size that each component of the overall system requires and the required precise alignment between the beam paths and the filters are indispensable and it is difficult to make the optical system.

SUMMARY

The present invention solves the problems associated with the prior art through a method of combining each light beam initially admitted so that the separated light source is combined and is applied to each use.

One object of the present invention is to provide an apparatus for combining light beams using two flat plates to combine wavelengths such as blue, green and red, into a single light source by a easier and simple small-sized device and make the combined light beam smoothly enter an apparatus for displaying the final information.

Another object of the present invention is to provide a method for combining light beams using two flat plates to combine wavelengths such as blue, green and red, into a light source by a easier and simple small-sized device and make the combined light beam smoothly enter an apparatus for displaying the final information.

According to one embodiment of the present invention, an apparatus for combining at least two light beams into a combined light beam using two flat plates, the at least two incident light beams with wavelengths different from each other entering the apparatus parallel to one another and spaced apart from one another at a substantially equal interval, includes a reflection mirror reflecting the at least two incident light beams; at least one filter transmitting only at least one light beam with a specific wavelength and reflecting light beams with other wavelengths; a medium which is located between the reflection mirror and the filter, through which the at least one transmitted light beam and the reflected light beams pass; and wherein the combined light beam is formed from the transmitted light beam and the reflected light beams before exiting the apparatus.

According to one embodiment of the present invention, a method of combining three incident light beams includes the steps of first-reflecting in a medium a light beam with a first wavelength of the three incident light beams entering in parallel; transmitting only a light beam with a second wavelength different from the first wavelength from the incident light beams into the medium and reflecting light beams with other wavelengths and second-reflecting the light beam with the first wavelength first-reflected within the medium, making a first combined light beam by combining the transmitted light beam with the second wavelength and the second-reflected light beam with the first wavelength; third-reflecting the first combined light beam within the medium; transmitting only a light beam with a third wavelength different from the first and second wavelengths from the incident light beams into the medium and reflecting the light beams with other wavelengths and fourth-reflecting the first combined light beam third-reflected within medium, making a second combined light beam of white-light by combining the transmitted light beam with the third wavelength and the fourth-reflected first combined light beam and sending it out of the medium; and making a point at which the first-reflected light beam with the first wavelength is second-reflected correspond to a point at which the light beam with the second wavelength is transmitted and making a point at which the third-reflected first combined light beam is fourth-reflected correspond to a point at which the light beam with the third wavelength is transmitted by adjusting a thickness of the medium.

BRIEF DESCRIPTION OF THE DRAWINGS

Other objects and advantages of the invention will become apparent upon reading the following detailed descriptions and upon reference to the drawings.

Figure 1:
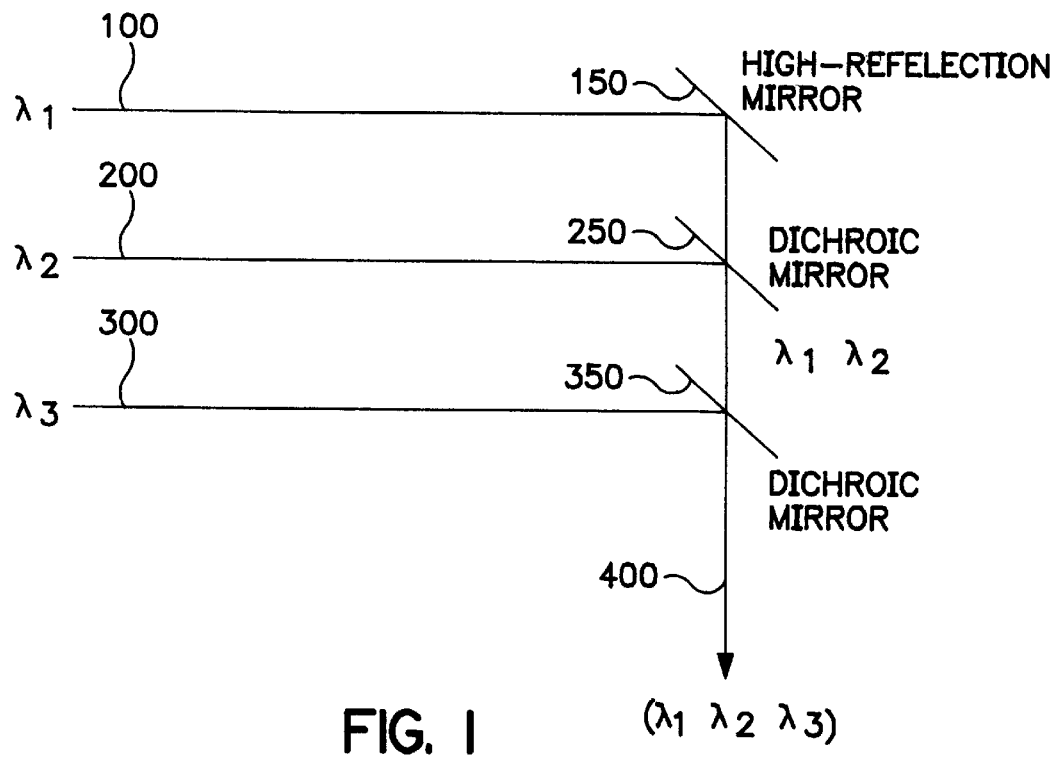
FIG. 1 illustrates a structure for combining light beams according to the prior art.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

According to one embodiment of the present invention, the apparatus for combining at least two light beams into a combined light beam using two flat plates, the at least two light beams with wavelengths different from each other entering the apparatus parallel to one another and spaced apart at substantially equal intervals from each other includes:

a reflection mirror reflecting the at least two light beams;

at least one filter transmitting only at least one light beam with a specific wavelength and reflecting light beams with the other wavelengths; and a medium located between the reflection mirror and the filter, through which the transmitted light beam and the reflected light beams pass, wherein the combined light beam is formed from the transmitted light beam and the reflected light beams before exiting the apparatus.

According to one embodiment of the present invention, the reflection mirror and the filter are maintained at an equal distance from one another by the medium and the thickness of the medium is set so that the point at which the light beam is reflected in the medium by the reflection mirror and then reflected again at the filter within the medium corresponds with the point at which the light beam from the external side of the medium is transmitted into the medium by the filter.

According to one embodiment of the present invention, the medium is air.

According to one embodiment of the present invention, the reflection mirror is a broad band high-reflection mirror or a total reflection film and the filter is a dichroic mirror.

According to one embodiment of the present invention, the apparatus for combining three incident light beams having first, second, and third wavelengths different from one another, which enter the apparatus parallel to each other comprises:

a reflection mirror first-reflecting a light beam with the first wavelength from the incident light beams within a medium;

a first dichroic mirror transmitting only a light beam with the second wavelength from the incident light beams and reflecting light beams with the other wavelengths;

a second dichroic mirror transmitting only a light beam with the third wavelength from the incident light beams and reflecting light beams with the other wavelengths;

the first dichroic mirror second-reflecting the first-reflected light beam with the first wavelength within the medium;

the reflection mirror third-reflecting a first combined light beam made by combining the second-reflected light beam with the first wavelength and the light beam with the second wavelength transmitted into the medium by the first dichroic mirror within the medium;

the second dichroic mirror fourth-reflecting the third-reflected first combined light beam within the medium; and wherein a second combined light beam exits the medium which is made by combining the fourth-reflected first combined light beam and the light beam with the third wavelength transmitted into the medium by the second dichroic mirror.

According to another embodiment of the present invention the apparatus for combining three incident light beams having first, second, and third wavelengths different from one another, which enter the apparatus parallel to each other comprises:

a first dichroic mirror transmitting only a light beam with the first wavelength and reflecting light beams with the other wavelengths from the incident lights;

a reflection mirror first-reflecting the light beam with the first wavelength reflected by the first dichroic mirror within medium;

a second dichroic mirror transmitting only a light beam with the second wavelength and the reflecting light beams with the other wavelengths from the incident light beams;

a third dichroic mirror transmitting only a light beam with the third wavelength from the incident light beams and reflecting light beams with the other wavelengths;

the second dichroic mirror second-reflecting the first-reflected light beam with the first wavelength within medium;

the reflection mirror third-reflecting a first combined light beam made by combining the second-reflected light beam with the first wavelength and the light beam with the second wavelength transmitted into the medium by the second dichroic mirror;

the third dichroic mirror fourth-reflecting the third-reflected first combined light beam within the medium; and a second combined light beam exiting the medium made by combining the fourth-reflected first combined light beam and the light beam with the third wavelength transmitted into the medium by the third dichroic mirror.

According to another embodiment of the present invention, a method of combining three incident light beams having first, second, and third wavelengths different from one another, which enter an apparatus parallel to each other includes the steps of:

first-reflecting a light beam with a first wavelength within a medium entered into the medium from the incident light beams;

transmitting only a light beam with the second wavelength from the incident light beams into the medium and reflecting light beams with the other wavelengths and by second-reflecting the first-reflected light beam with the first wavelength in the medium, making a first combined light beam by combining the transmitted light beam with the second wavelength and the second-reflected light beam with the first wavelength;

third-reflecting the first combined light beam within the medium;

transmitting only the light beam with the third wavelength from the incident light beams into the medium and reflecting light beams with the other wavelengths and fourth-reflecting the third-reflected first combined light beam within the medium, making a second combined light beam of white-light by combining the transmitted light beam with the third wavelength and the fourth-reflected first combined light beam and sending it out from the medium; and making a point at which the first-reflected light beam with the first wavelength is second-reflected correspond with a point at which the light beam with the second wavelength is transmitted and making a point at which the third-reflected first combined light beam is fourth-reflected correspond to a point at which the light beam with the third wavelength is transmitted by adjusting thickness of the medium.

The present invention will be explained in detail referring to the drawings.

The present invention is intended to improve the structure of a light application apparatus greatly by reforming the structure for light combining so that the alignment of the optical system is easy and the overall system has a small size. According to one embodiment of the present invention, the apparatus for combining light beams combines two or more incident light beams entering with wavelengths different from each other and parallel to one another at equal distances from one another into one combined light beam. The apparatus includes a reflection mirror (4) for reflecting light beams with all of wavelengths, at least one or more filters (5, 6) for transmitting only light beams with specific wavelengths and reflecting light beams with the other wavelengths, and a medium which is located between the reflection mirror and the filter, through which the transmitted light beams and the reflected light beams pass.

The reflection mirror and the filter are maintained at an equal distance by the medium and the thickness of the medium is set so that the point at which the light beam is reflected in the medium by the reflection mirror and then reflected again at the filter in the medium corresponds with the point at which the light beam from the external side of the medium is transmitted in the medium by the filter.

According to one embodiment of the present invention, the medium is air or another gas. Additionally, the reflection mirror is a broad band high-reflection mirror or a total reflection mirror and the filter is a dichroic mirror.

Figure 2:
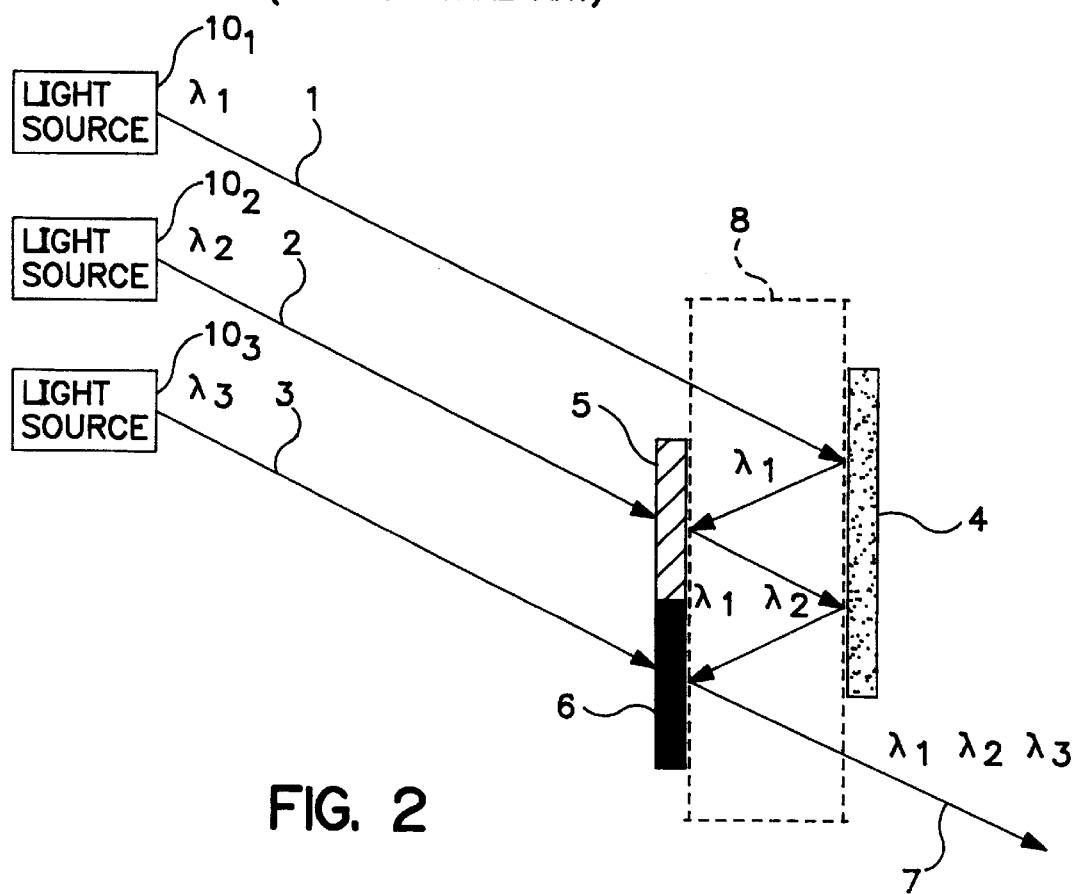
FIG. 2 illustrates a detailed view of a sub-system for combining light beams according to one embodiment of the present invention.

According to one embodiment of the present invention, the structure of a light combining sub-system for light beams entered from a modulating sub-system is shown in FIG. 2. The light beams that are combined in the apparatus according to the present invention are three light beams having wavelengths of blue, green and red colors.

Now, $\lambda 1, \lambda 2, \lambda 3$ in the following explanation correspond to blue, green and red, respectively, to help understanding for the $\lambda 1$ (1), $\lambda 2$ (2), $\lambda 3$ (3) of the three light sources. It is understood that it is within the skill of ordinary artisan to arrange the apparatus according to the present invention so that each of the three light beams can be any one of the colors red, blue, or green.

The apparatus according to one embodiment of the present invention includes a broad band high-reflection mirror (4) functioning as a reflection mirror in the light combining sub-system, a first dichroic mirror (5) reflecting the blue and red wavelength light beams and transmitting the green wavelength light beam and a second dichroic mirror (6) transmitting the red wavelength light beam and reflecting the blue wavelength light beam and the green wavelength light beam.

The first and second dichroic mirrors (5, 6) are made on the same flat plate. An air gap is provided as the medium (8) between the broad band high-reflection mirror (4) and the first and second dichroic mirrors (5, 6), such that the broad band high-reflection mirror (4) and the first and second dichroic mirrors (5, 6) are maintained at an equal distance and parallel with each other.

As shown in the embodiment of FIG. 2, from the incident light beams (1, 2, 3) generated by light sources $10_1, 10_2, 10_3$, entering parallel to each other, the blue light beam (1) hits the broad band high-reflection mirror (4) at a specific angle and is reflected at the same angle. The reflected blue light beam (1) then hits the first dichroic mirror (5) at the same angle as the initial angle and is reflected, again at the same angle. The green light beam (2) is transmitted through the first dichroic mirror (5) at the position of reflection of the reflected blue light and is combined with the blue light beam into one light beam. The combined light beam then hits the high-reflection mirror (4) and is reflected again at the same angle. The reflected combined beam then hits the second dichroic mirror (6) and is reflected. The red light beam (3) is also transmitted through the second dichroic mirror (6) at the position of reflection of the reflected combined light beam and is combined with the combined blue and the green light beam. The second combined light beam (7) then exits the apparatus.

Figure 3:
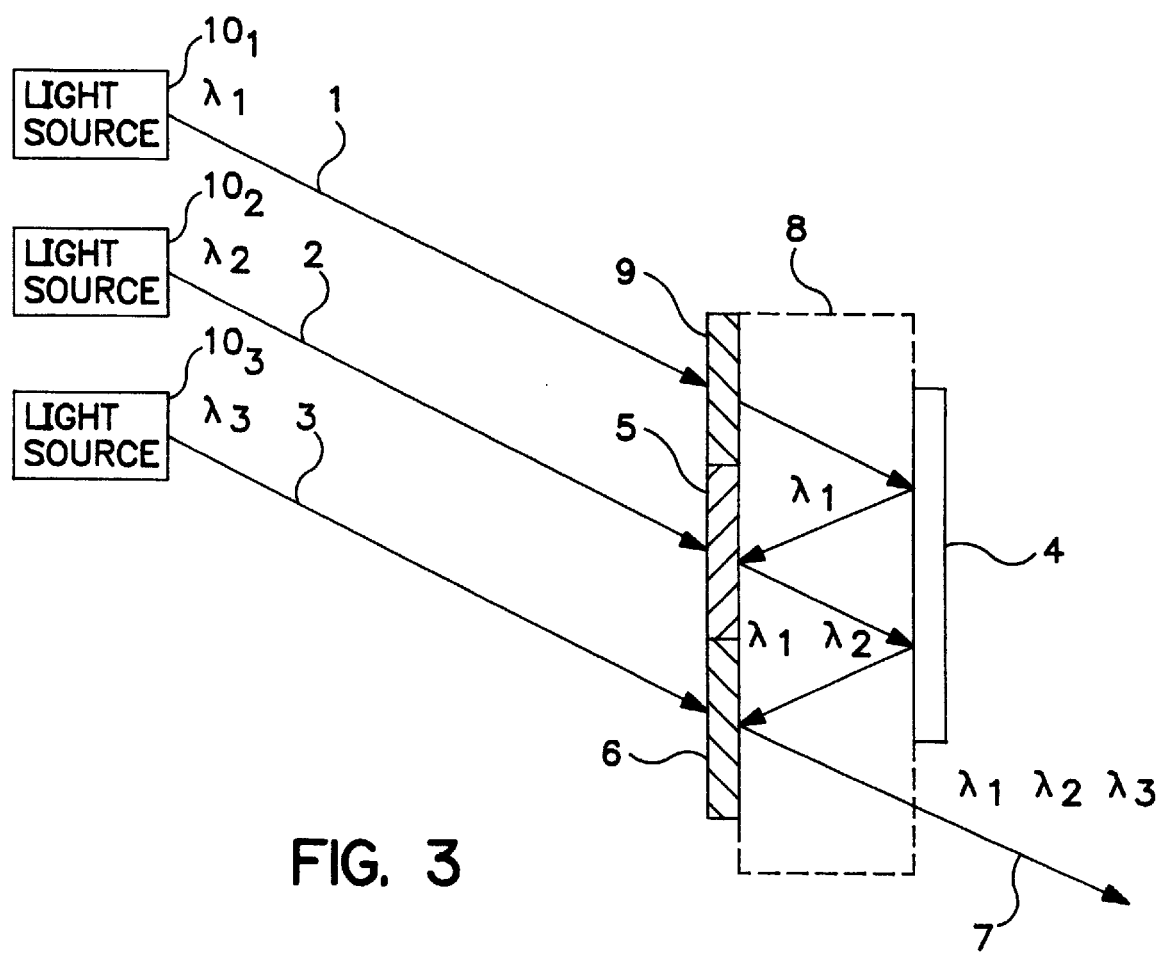
FIG. 3 illustrates a detailed view of a sub-system for combining light beams according to another embodiment of the present invention.

According to another embodiment of the present invention it is possible to add a third dichroic mirror (9) which transmit a light beam with the blue wavelength and reflects the light beams with green and red wavelengths. This embodiment is illustrated in FIG. 3. The remainder of the apparatus shown in FIG. 3 operates the same as the corresponding portions of FIG. 2, and will not be further described.

The apparatus for combining laser beams according to the present invention is comprised of two plates made as shown in FIG. 2 or FIG. 3. One of the flat plates is the broad band high-reflection mirror (4) and the other flat plate is a dichroic mirror on which the first and second dichroic mirrors (5, 6), or the first, second, and third dichroic mirror (5, 6, 9) are made. The two flat plates are positioned at an equal distance and parallel with each other.

The high-reflection mirror and the dichroic mirrors should be positioned parallel to one another and manipulated so that adjusting the incident angle and the interval between the mirrors appropriately precisely aligns the three light beams.

The present invention has simple structure and small size compared to the structure of the prior art light combining sub-system, so it is easy to manipulate the combining of three separated colors and the combining of the light is smoothly performed by adjusting the interval and the angle appropriately. As a result of the above, it is easy to be manufactured. Therefore, the light combining sub-system manufactured by the present invention can be applied to a light application apparatus and can be widely used.

As stated above, the present invention has an advantage in that it displays a similar performance to the prior art optical system with a simpler and smaller-sized structure and realizes a small-sized module and a simple optical system, so applying to light application apparatus is easy.

In particular, the present invention results in a simple structure for combining light beams which can be easily manipulated, so the present invention is very effective one to apply and use in commercial devices.

We claim:

1. A light combining apparatus using two flat plates for combining at least two incident light beams into a combined light beam using two flat plates, the at least two light beams with wavelengths different from each other entering the apparatus parallel to one another on one side of said light combining apparatus, and spaced from one another at equal intervals comprising:

a reflection mirror for reflecting at least one of the at least two incident light beams;

at least one filter for transmitting at least one light beam with a specific wavelength and reflecting light beams with the other wavelengths;

a medium which is located between the reflection mirror and the filter, through which the at least one transmitted light beam and the at least one reflected light beam pass; and wherein the combined light beam is formed from the at least one transmitted light beam and the at least one reflected light beam before exiting the apparatus.

2. A light combining apparatus as set forth in claim 1, wherein the reflection mirror and the at least one filter are maintained at an equal distance from one another by the medium and a thickness of the medium is set such that a point at which the light beam is reflected in the medium by the reflection mirror and then reflected again by the at least one filter corresponds to a point at which the light beam from an external side of the medium is transmitted into the medium by the at least one filter.

3. A light combining apparatus as set forth in claim 2, wherein the reflection mirror is a broad band high-reflection mirror or a total reflection mirror and the at least one filter is a dichroic mirror.

4. A light combining apparatus as set forth in claim 1, wherein the medium is air.

5. A light combining apparatus as set forth in claim 4, wherein the reflection mirror is a broad band high-reflection mirror or a total reflection mirror and the at least one filter is a dichroic mirror.

6. A light combining apparatus as set forth in claim 1, wherein the reflection mirror is a broad band high-reflection mirror or a total reflection mirror and the at least one filter is a dichroic mirror.

7. A light combining apparatus as set forth in claim 1, wherein the reflection mirror is formed on one of the flat plates and the at least one filter is formed on the other of the flat plates.

8. A light combining apparatus for combining three incident light beams having different wavelengths, entering the apparatus in parallel to each other and on one side of said light combining apparatus, into a single combined light beam, the apparatus comprising:

a reflection mirror first-reflecting a light beam with a first wavelength from the incident light beams within medium;

a first dichroic mirror transmitting only a light beam with a second wavelength from the incident light beams and reflecting light beams with other wavelengths;

a second dichroic mirror transmitting only a light beam with a third wavelength from the incident light beams and reflecting light beams with other wavelengths;

the first dichroic mirror second-reflecting the first-reflected light beam with the first wavelength within the medium;

the reflection mirror third-reflecting a first combined light beam made by combining the second-reflected light beam with the first wavelength and the light beam with the second wavelength transmitted into medium through the first dichroic mirror;

the second dichroic mirror fourth-reflecting the third reflected first combined light beam within the medium; and wherein a second combined light beam exits the medium which is made by combining the fourth-reflected first combined light beam and the light beam with the third wavelength transmitted into the medium through the second dichroic mirror.

9. A light combining apparatus for combining three incident light beams having different wavelengths entering the apparatus in parallel to each other on one side of said light combining apparatus, into a single combined light beam, the apparatus comprising:

a first dichroic mirror transmitting only a light beam with a first wavelength and reflecting light beams with other wavelengths from the incident light beams;

a reflection mirror first-reflecting the light beam with the first wavelength transmitted into the medium through the first dichroic mirror within the medium;

a second dichroic mirror transmitting only a light beam with a second wavelength and reflecting light beams with other wavelengths from the incident light beams;

a third dichroic mirror transmitting only a light beam with a third wavelength from the incident light beams and reflecting light beams with other wavelengths;

the second dichroic mirror second-reflecting the first-reflected light beam with the first wavelength within the medium;

the reflection mirror third-reflecting a first combined light beam made by combining the second-reflected light beam with the first wavelength and the light beam with the second wavelength transmitted into medium through the second dichroic mirror within the medium;

the third dichroic mirror fourth-reflecting the third-reflected first combined light beam within the medium; and wherein a second combined light beam exits the medium which is made by combining the fourth-reflected first combined light beam and the light beam with the third wavelength transmitted into the medium through the third dichroic mirror.

10. A method of combining three incident light beams having different wavelengths entering an apparatus in parallel with each other to form a single combined light beam comprising the steps of:

first-reflecting in a medium a light beam with a first wavelength entered into the medium from the incident light beams;

transmitting only a light beam with a second wavelength from the incident light beams into the medium and reflecting light beams with other wavelengths and second-reflecting the first-reflected light beam with the first wavelength within the medium, making a first combined light beam by combining the transmitted light beam with the second wavelength and the second-reflected light beam with the first wavelength;

third-reflecting the first combined light beam within the medium;

transmitting only a light beam with a third wavelength from the incident light beams into the medium and reflecting light beams with the other wavelengths and fourth-reflecting the third-reflected first combined light beam within the medium, making a second combined light beam of white-light by combining the transmitted light beam with the third wavelength and the fourth-reflected first combined light beam and sending it out from the medium;

making a point at which the first-reflected light beam with the first wavelength is second-reflected correspond to a point at which the light beam with the second wavelength is transmitted; and making a point at which the third-reflected first combined light beam is fourth-reflected correspond to a point at which the light beam with the third wavelength is transmitted by adjusting a thickness of the medium.

* * * * *